United States Patent
Alff

(10) Patent No.: US 12,319,100 B2
(45) Date of Patent: Jun. 3, 2025

(54) METHOD FOR OBTAINING THE DEFORMATION OF A TIRE UNDER LOAD WHEN RUNNING

(71) Applicant: COMPAGNIE GENERALE DES ETABLISSEMENTS MICHELIN, Clermont-Ferrand (FR)

(72) Inventor: Denis Alff, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 367 days.

(21) Appl. No.: 17/416,950

(22) PCT Filed: Dec. 16, 2019

(86) PCT No.: PCT/FR2019/053091
§ 371 (c)(1),
(2) Date: Jun. 21, 2021

(87) PCT Pub. No.: WO2020/128278
PCT Pub. Date: Jun. 25, 2020

(65) Prior Publication Data
US 2022/0080790 A1 Mar. 17, 2022

(30) Foreign Application Priority Data

Dec. 21, 2018 (FR) .......................... 1873907
Jan. 30, 2019 (FR) .......................... 1900874

(51) Int. Cl.
*B60C 23/06* (2006.01)
(52) U.S. Cl.
CPC ................ *B60C 23/061* (2013.01)
(58) Field of Classification Search
CPC .................................................. B60C 23/061
See application file for complete search history.

(56) References Cited

U.S. PATENT DOCUMENTS 6,142,026 A * 11/2000 Ohashi ............... B60C 23/061
                                                                 701/65
8,024,087 B2    9/2011 Mancosu et al.
(Continued)

FOREIGN PATENT DOCUMENTS

DE    10 2011 000 556 A1    8/2012
WO       2006/034731 A1    4/2006
(Continued)

OTHER PUBLICATIONS

International Search Report dated Feb. 19, 2020, in corresponding PCT/FR2019/053091 (4 pages).

*Primary Examiner* — Hunter B Lonsberry
*Assistant Examiner* — Harrison Heflin
(74) *Attorney, Agent, or Firm* — VENABLE LLP

(57) ABSTRACT

A method for obtaining the deformation of a tire casing subjected to a load, rotating at a rotational speed W, comprising: Phase 1—Delimiting the first signal over a whole number of wheel revolutions to construct a first wheel revolution signal; and Determining a reference acceleration; and Phase 2—Delimiting the signal over a whole number of wheel revolutions to construct a second wheel revolution signal; Defining at least a first energy density S which is a function of the second wheel revolution signal, and of the reference acceleration, and which is denoted S+ when the wheel revolution signal is above a threshold value A, or is denoted S− when the wheel revolution signal is below or equal to said threshold value A; and Identifying the deformation as a function of the reference acceleration and of the first energy density S.

13 Claims, 3 Drawing Sheets

(56) References Cited

U.S. PATENT DOCUMENTS

| | | |
|---|---|---|
| 10,882,366 B2 | 1/2021 | Kuchler |
| 11,067,431 B2 | 7/2021 | Cyllik et al. |
| 2007/0255510 A1 | 11/2007 | Mancosu et al. |
| 2008/0103659 A1 | 5/2008 | Mancosu et al. |
| 2018/0180463 A1 | 6/2018 | Cyllik et al. |
| 2019/0168550 A1 | 6/2019 | Kuchler |
| 2021/0199686 A1* | 7/2021 | Honda .................... G01P 15/08 |
| 2021/0379954 A1* | 12/2021 | Bremmer ........... B60G 17/0165 |
| 2022/0080789 A1 | 3/2022 | Alff |
| 2023/0041164 A1 | 2/2023 | Alff |

FOREIGN PATENT DOCUMENTS

| | | |
|---|---|---|
| WO | 2017/032466 A1 | 3/2017 |
| WO | 2018/029320 A1 | 2/2018 |

* cited by examiner

METHOD FOR OBTAINING THE DEFORMATION OF A TIRE UNDER LOAD WHEN RUNNING

FIELD OF THE INVENTION

The present invention relates to methods for obtaining the deformation of a tyre casing of a wheel-tyre assembly subjected to load under running conditions.

TECHNOLOGICAL BACKGROUND

In the field of devices and methods for measuring the deformation of a wheel-tyre assembly, these devices and methods are used chiefly to characterize the result of the deformation of the tyre casing caused by the applied load. Thus, the devices and methods seek to characterize mainly the footprint of the tyre on the ground, which is referred to as the contact patch. Specifically, the geometry or distribution of stresses within this contact patch are directly connected to the load applied to the tyre casing, possibly via the inflation pressure of the wheel-tyre assembly.

This contact patch, which represents only a minimal percentage of the periphery of the tyre casing in the inflated and mounted condition, is also highly sensitive to various parameters such as the macroroughness of the ground or unevennesses on the ground for example. Specifically, the true area of contact between the tyre casing and the ground may then correspond to the tops of the indenting features that characterize the macroroughness of the ground. This then modifies the distribution of the stresses in the tyre casing and may have an influence on the dimensions of the contact patch.

In addition, a precise determination of the dimensions of the contact patch is difficult to achieve under running conditions. Conventionally, during running, the contact patch is characterized using signals representative of the deformation of the tyre casing. These present a significant jump in the observed quantity, indicating the transition of the tyre casing from a free toroidal shape to a partially compressed toroidal shape with imposed movement. Specifically, the ground then constitutes a boundary condition of imposed movement type for the material points on the tyre casing. It is therefore difficult to identify the exact contact patch entry or exit points, particularly under conditions of running at variable speed. In addition, the contact patch represents only part of the development of the tyre casing, conventionally between 1/20 and 1/10 of the development of the tread. In order to obtain a precise picture of this portion of the tyre, it is necessary to employ a fine discretization of the deformation signal. This requires significant memory capacity, and high spatial sampling frequencies, at least in the region of the contact patch, and this all consumes a great deal of energy.

Prior art document WO2017/32466A1 is known and discloses a device for characterizing the load applied to a wheel-tyre assembly on the basis of an accelerometer mounted on the tyre.

SUMMARY OF THE INVENTION

The present invention relates to a method that allows the deformation of the tyre casing to be evaluated precisely and in real-time under running conditions, notably conditions of running at variable speed, while at the same time saving on measurement device resources.

DETAILED DESCRIPTION OF THE INVENTION

The invention relates to a method for obtaining the deformation of a tyre casing subjected to a load, in an inflated and laden state rotating at a rotational speed W. The tyre casing having a crown, two sidewalls and two beads of revolution about a natural axis of rotation and a median plane, the intersection between the median plane and the natural axis of rotation defines a wheel centre. The method comprises the following steps:

Fixing a sensor on the tyre casing in line with the crown at a radial position R with respect to the natural axis of rotation and able to generate at least one output signal proportional to the acceleration experienced by said sensor in the tyre casing;

Acquiring a first abscissa signal u comprising at least the amplitude of the acceleration in the direction normal to the crown when running at the rotational speed W, at a sampling frequency fe the spatial discretization of which is less than 6 degrees, preferably less than 3 degrees, and very preferably less than 1 degree;

During a first phase:
Fixing a constant first sampling frequency fe1;
Delimiting the first signal over a whole number $N^{TdR1}$ of wheel revolutions, $N^{TdR1}$ being greater than or equal to 1, so as to construct a first wheel revolution signal $Sig^{TdR1}$.
Determining a first reference acceleration $\gamma^{reference1}$ as being the mean value of the first wheel revolution signal $Sig^{TdR1}$ with respect to one wheel revolution, using the following formula:

$$\gamma^{reference1} = \frac{\left(\sum_{Sig^{TdR1}} Sig^{TdR1}\right)}{N^{U1}} \quad \text{[Math 1]}$$

where $N^{u1}$ is the number of points in $Sig^{TdR1}$

During a second phase:
Fixing a constant second sampling frequency fe2;
Delimiting the first signal over a whole number $N^{TdR2}$ of wheel revolutions, $N^{TdR2}$ being greater than or equal to 1, so as to construct a second wheel revolution signal $Sig^{TdR2}$.
Defining at least a first energy density S which is a function of the second wheel revolution signal $Sig^{TdR2}$, and of the reference acceleration $\gamma^{reference1}$, and which is denoted $S^+$ when the wheel revolution signal is above a threshold value A, or is denoted $S^-$ when the wheel revolution signal is below or equal to said threshold value A, using the following formulae:

$$S^+ = \left|\sum\nolimits_{Sig^{TdR2}>A}\left(Sig^{TdR2} - \gamma^{Reference1}\right)\right| * \frac{N^{TdR2}}{N^{U2}}; \text{ and} \quad \text{[Math 2a]}$$

$$S^- = \left|\sum\nolimits_{Sig^{TdR2}\leq A}\left(Sig^{TdR2} - \gamma^{Reference1}\right)\right| * \frac{N^{TdR2}}{N^{U2}}; \quad \text{[Math 2b]}$$

Where $N^{U2}$ is the number of points in $Sig^{TdR2}$
Identifying the deformation of the tyre casing $Def_\%$, which deformation is generated by the load as a function of the first reference acceleration $\gamma^{reference1}$ and of the first energy density S using one of the following formulae:

$$Def_{\%} = \frac{N^{U1}}{N^{U2}} * \frac{\left|\sum_{Sig^{TdR2}>Ao}\left(Sig^{TdR2} - \gamma^{Reference1}\right)\right|}{\left(\sum_{Sig^{TdR1}} Sig^{TdR1}\right)}, \text{ or} \qquad \text{[Math 3a]}$$

$$Def_{\%} = \frac{N^{U1}}{N^{U2}} * \frac{\left|\sum_{Signal^{TdR2}\leq A}\left(Sig^{TdR2} - \gamma^{Reference1}\right)\right|}{\left(\sum_{Sig^{TdR1}} Sig^{TdR1}\right)}, \text{ or} \qquad \text{[Math 3b]}$$

$$Def_{\%} = \frac{N^{U1}}{N^{U2}} * \frac{\left|\sum_{Sig^{TdR2}>A}\left(Sig^{TdR2} - \gamma^{Reference1}\right)\right| + \left|\sum_{Sig^{TdR2}\leq A}\left(Sig^{TdR2} - \gamma^{Reference1}\right)\right|}{2*\left(\sum_{Sig^{TdR1}} Sig^{TdR1}\right)}. \qquad \text{[Math 3c]}$$

This method is characterized by these two distinctive phases. During the first phase, a certain number of magnitudes are evaluated on part of the first signal. The evaluation of these magnitudes corresponds to elementary mathematical operations that allow savings to be made in terms of the battery power and the memory capacity of the electronic device. Specifically, determining the first reference acceleration involves only summing the successive values of the signal coming from the sensor and counting the number of increments. When the number of wheel revolutions of this first wheel revolution signal has been determined, the sum of the values from the sensor is divided by the total number of increments NUI in order to obtain $\gamma^{reference1}$. This then minimizes the memory space of the electronic device to just two spaces, a first space for the value of the sum up to the previous step, and a second space for the new value from the sensor. The sum is calculated and assigned to the first space, and the new value from the sensor is entered into the second space. A counter that counts the increments of the values from the sensor is needed.

In the second step, the results from the first phase are used as fixed values. Once again, for the values of the first energy densities, very few of the resources of the electronic device are consumed here. Specifically, after having identified the first increment of the second wheel revolution signal, a comparison is made between the value from the sensor and a threshold value A, so that the result of the coming operation can be assigned as being a positive energy density $S^+$ or a negative one $S^-$. This result is simply the difference between the value from the sensor and the first reference acceleration. In parallel, the number of values delivered by the sensor is counted using a counter $N^{U2}$. For any increment, the values from the sensor are summed in a first memory space Y. This value is also compared against the threshold value A in order to identify how to assign the result of this increment between the two counters $S^+$ and $S^-$. The difference between the value from the sensor and the first reference acceleration is calculated. This result is summed with the counter $S^+$ or $S^-$ identified. The counter $N^{U2}$ of values delivered by the sensor is increased by 1. At the end of the second wheel revolution signal, the counters $S^+$ and $S^-$ are divided by the value from the counter $N^{U2}$ after the value from the counters has been multiplied by the number of wheel revolutions $N^{TDR2}$ in the second signal. The contents of the first memory space Y are also divided by $N^{U2}$ in order to obtain $\gamma^{reference2}$.

For the deformation of the tyre casing, the device once again uses the results from the first phase. In addition, the same incremental calculation of the difference between the value from the sensor and the first reference acceleration is used and classified between the counters $S^+$ and $S^-$. This time, at the end of the increments of the second wheel revolution signal, each of the counters $S^+$ and $S^-$ is multiplied by the total number of increments $N^{U1}$ in the first wheel revolution signal. Each of the results is then divided by the total number of increments $N^{U2}$ in the second signal. This then identifies two intermediate values α and β which are respectively associated with the counters $S^+$ and $S^-$. Depending on which tyre casing deformation formula is to be employed, these intermediate values are divided by the first reference acceleration $\gamma^{reference1}$ evaluated during the first phase or these intermediate results are summed before dividing the sum by twice the first reference acceleration $\gamma^{reference1}$.

In this way, the desired result is obtained in real-time, at the end of the second phase. The result requires only very little by way of memory resources because the breakdown into two phases allows the signal to be processed little by little without storing all of the values of at least one wheel revolution. Further, the operations performed are elementary and consume little by way of energy. Finally, the result is precise because, unlike the traditional methods which focus on extremely small contact patch entry and exit areas of the signal, the method exploits the entirety of the signal. Thus, a small error associated for example with the spatial discretization will not have a very great impact on the result, unlike in the traditional methods. The advantage of this is that the method works with spatial sampling that is fairly coarse by comparison with the traditional methods to achieve a precision the quality of which is at least equal, or even better because it is less sensitive to isolated external events. Finally, because the calculation can be performed in the electronic device associated with the sensor, only the end result therefore needs to be transmitted to outside of the electronic device. For example, this transmission may be by radiofrequency means. The fact that it is only a scalar quantity that is transmitted is economical in terms of energy by comparison with methods in which the sensor data need to be fully or partially transmitted.

Advantageously, the acquisition of the first signal is performed for a rotational speed W greater than or equal to a threshold rotational speed $W_{seuil}$ defined by the following formula:

$$W_{seuil} = \frac{12}{\sqrt{Dev}}; \qquad \text{[Math 4]}$$

where Dev is the development of the tyre casing.

Thus, if the running speed is above the threshold value, it is easy to dissociate the wheel revolution signal from the threshold value A and to do so whatever the unforeseeable variations in the wheel revolution signal such as, for example, a high level of macroroughness of the roadway, electromagnetic interference in the measurement sequence, vibrations in the tyre casing. In addition, that also allows the signal due to gravity to be identified more cleanly in the wheel revolution signal.

As a preference, the delimitation of the first signal over a number $N^{TdR1}$ of wheel revolutions comprises the following steps:

During the first phase:
  Identifying a first series of increments I, corresponding to the abscissa value u of the first signal at which the first signal crosses above or below a threshold value E;

Delimiting the first signal between a first increment $I_{min}$ and a second increment $I_{max}$ so as to construct a first wheel revolution signal $Sig^{TdR1}$, Determining the number of wheel revolutions $N^{TdR1}$ as being the difference $I_{max}$ minus $I_{min}$;

In this embodiment, only the first signal is used to delimit this over a whole number of wheel revolutions. Specifically, the signal of the acceleration in the radial direction of a tyre casing subjected to a load will necessarily tend towards zero as the sensor passes through the contact patch if the Earth's gravity signal is neglected as for high rotational speeds. Thus, the first signal will have to pass through a threshold value E. In fact, the first signal will pass through this threshold value twice per revolution of the wheel. The first time, it will pass through the threshold value from above. The second time, it will pass through the threshold value from below. The direction of crossing corresponds to either entering or exiting the contact patch. By taking only one type of crossing into consideration, this becomes a wheel revolution detector using the first signal from the sensor. Because of the coarse spatial discretization that can be employed, this detection is good enough for the method for evaluating the deformation of the tyre casing.

Of course, it is entirely possible to delimit the wheel revolution signal using a wheel revolution encoder associated with an electronic device comprising the sensor or to use another signal that has a characteristic in the wheel revolution. For example, it might be possible to use an accelerometer signal for accelerations in the longitudinal or axial direction in the frame of reference of the tyre casing, which exhibits singularities associated with the entering or exiting of the contact patch. However, such methods entail processing other signals simultaneously with and in addition to the radial direction of the acceleration, and this is costly in terms of memory and power resources.

Highly preferably, the identification of the threshold E comprises the following steps:

Before the first phase:
  Fixing a sampling frequency fe0 for a first part of the first signal;
  Identifying the maximum value MAX on the first part of the first signal;
  Defining a threshold value E which is a function of the value MAX, E preferably being comprised between 10% and 50% of MAX.

In this highly preferentially embodiment, a step referred to as an excursion step is performed on part of the first signal in order to estimate very roughly but very simply a mean value for this first signal which is referred to as MAX. Of course, it is not necessary for the sampling frequency in this excursion step to be as fine as it is during the two phases of the method. Likewise, this frequency has no need to be constant, it may be adaptive in order to be more selective with regard to the values of the first signal, the sole objective being to obtain a value that does not lie in the contact patch. Fewer than 10 unevenly spaced acquisitions are entirely sufficient. This embodiment then makes it possible to determine a threshold E which represents only 10 to 50% of the identified value MAX. This threshold value E is used to delimit the first signal during the first phase. If analyses have already been performed on previous revolutions and an earlier value $\gamma^{reference}$ is available, this value may advantageously be reused as the given MAX.

According to a first embodiment, the delimitation of the first signal over a number $N^{TdR2}$ of wheel revolutions comprises the following steps:

During the second phase:
  Identifying a first series of increments J, corresponding to the abscissa value u of the first signal at which the first signal crosses above or below a threshold value E', preferably lying below at least half the first reference acceleration $\gamma^{reference1}$;
  Delimiting the first signal between a first increment $J_{min}$ and a second increment $J_{max}$ so as to construct a second wheel revolution signal $Sig^{TdR2}$,
  Determining the number of wheel revolutions $N^{TdR2}$ as being half of the difference $J_{max}$ minus $J_{min}$;

This embodiment is fairly simple to implement. Specifically, during the first phase, a first reference acceleration $\gamma^{reference1}$ has been identified using the first wheel revolution signal $Sig^{TdR1}$. It is thus easy to identify a threshold value E'. Specifically, the signal of the acceleration in the radial direction of a tyre casing subjected to a load will necessarily tend towards zero as the sensor passes through the contact patch if the Earth's gravity signal is neglected as for high rotational speeds. Thus, the first signal will have to pass through a threshold value that is situated below at least half of a reference acceleration $\gamma^{reference1}$. In fact, the first signal will pass through this threshold value twice per revolution of the wheel. The first time, it will pass through the threshold value from above. The second time, it will pass through the threshold value from below. The direction of crossing corresponds to either entering or exiting the contact patch. By taking only one type of crossing into consideration, this becomes a wheel revolution detector using the first signal from the sensor. Because of the coarse spatial discretization that can be employed, this detection is good enough for the method for evaluating the deformation of the tyre casing.

According to a second embodiment, the delimitation of the first signal over a number $N^{TdR2}$ of wheel revolutions comprises the following steps:

During the first phase:
  Identifying the period $T_1$ using the following formula:

$$T_1 = \frac{N^{U1}}{fe1 * N^{TdR1}};$$ [Math 5]

During the second phase:
  Constructing a second wheel revolution signal $Sig^{TdR2}$ beginning with the abscissa value u of the first signal situated at $(1+M)/4$ periods $T_1$, M being a real positive number less than or equal to 2.0, preferably M is equal to unity, after the end of the first wheel revolution signal $Sig^{TdR1}$;
  Delimiting the second wheel revolution signal $Sig^{TdR2}$ over a duration $t_2$ corresponding to the period $T_1$ multiplied by a natural whole number N2, N2 preferably being unity;
  The number of wheel revolutions $N^{TdR2}$ is equal to N2;
  Identifying a first series of increments K, corresponding to the abscissa value u of the first signal beginning with the abscissa value u used to end at which the first signal crosses the first wheel revolution signal $Sig^{TdR1}$ above or below a threshold value E', preferably less than or equal to half the first reference acceleration $\gamma^{reference1}$;
  Determining $N^{U2}$ as being the number of points in the first signal, with respect to one revolution, between the increments $K_1$ and $K_{N2+1}$, using the formula:

$$N'^{U2} = \frac{(U_{K_{N2+1}} - U_{K_1})}{N2} * N2;$$ [Math 6]

or situated between the increments $K_1$ and $K_{N2+2}$, using the formula:

$$N'^{U2} = \frac{(U_{K_{N2+2}} - U_{K_1})}{N2+1} * N2.$$ [Math 7]

In this second embodiment, information regarding the first wheel revolution signal $\text{Sig}^{TdR1}$ is used to construct the second wheel revolution signal $\text{Sig}^{TdR2}$. Specifically, the period $T_1$ of the first wheel revolution signal $\text{Sig}^{TdR1}$ is extracted from the first phase. Next, a second wheel revolution signal $\text{Sig}^{TdR2}$ is delimited on the first signal as being a multiple N2 of the period $T_1$ by adopting any first increment of this first signal that is situated between one quarter and three quarters of the first wheel revolution after the end of the first wheel revolution signal $\text{Sig}^{TdR1}$. The duration of this second signal is then $t_2$. Thus, the second phase signal is situated as close as possible to the end of the first wheel revolution signal $\text{Sig}^{TdR1}$ This makes it possible to minimize the variation in rotational speed W of the tyre casing between the two wheel revolution signals $\text{Sig}^{TdR1}$ and $\text{Sig}^{TdR2}$. In addition, the collection of points that are situated between one quarter and three quarters of the wheel revolution delimited by the fronts representative of the contact patch ensures that the second wheel revolution signal $\text{Sig}^{TdR2}$ is delimited in areas in which the first signal changes only little. In addition, the amplitude is close to the mean value over the duration of the second wheel revolution signal $\text{Sig}^{TdR2}$. This means that errors associated with the discretization of the second wheel revolution signal $\text{Sig}^{TdR2}$ can be minimized.

It is therefore assumed that the number of wheel revolutions in this second wheel revolution signal $\text{Sig}^{TdR2}$ corresponds to the multiple N2 employed. A series of increments K is constructed from the abscissa value u of the first signal of which the first abscissa value corresponds to the abscissa value u that was used to delimit the end of the first wheel revolution signal $\text{Sig}^{TdR1}$. These increments K are identified when the first signal crosses above or below a threshold value E'. As a preference, this threshold value E' is less than half the first reference acceleration $\gamma^{reference1}$. Finally, there is determined a value $N'^{U2}$ which corresponds to the number of the first signal that are situated between two particular increments K. That means that any possible variation in the rotational speed W of the tyre casing between the two phases of the method can be taken into consideration.

Advantageously, the threshold value A for defining the first energy density is a function of the first reference acceleration $\gamma^{reference1}$.

The threshold value A makes it possible to discriminate between the positive and negative energy densities of the method.

Specifically, any measurement signal has associated noise. It is possible to filter or smooth this signal in real-time, but at the risk of losing information, particularly regarding the dynamics of the passage through the contact patch. By definition, this noise has a substantially zero mean value. Furthermore, while, in theory, it should have little or no effect on the calculation of the energy densities $S^+$ and $S^-$, it is liable to disturb the classification between $S^+$ and $S^-$, and therefore to falsify the end result. The purpose of this threshold value A is to allow the variations between the wheel revolution signal and the reference acceleration to be allocated to one or other of the energy densities, taking account of the variations in the wheel revolution signal that are due to disturbing influences and to a poor signal/noise ratio, it being possible for these disturbing influences to be the result of the macroroughness of the road, of isolated obstacles encountered on the road, of vibrations inherent to the tyre or to the vehicle on which it is mounted, or to small electromagnetic malfunctions of the measurement sequence which are inherent to the nature and quality of the electronic components used. Because the wheel revolution signal and the reference acceleration are dependent on the rotational speed W of the wheel-tyre assembly and on the radial position of the sensor, it would seem judicious to make the threshold value A dependent on the first reference acceleration $\gamma^{reference1}$ that has just been evaluated in the first phase of the method in order to get around these disturbing influences which could adversely affect the desired precision.

Highly advantageously, the threshold value A is a function of a factor C according to the following formula:

$$A = C * \gamma^{reference1}$$ [Math 8]

As a preference, the factor C is greater than or equal to 0.5 and less than or equal to 0.9.

This value for the factor C makes it possible at the same time to discriminate positive and negative energy densities in the wheel revolution signal. Specifically, on entering the contact patch, the wheel revolution signal tends towards zero. In addition, the transition on entering and exiting the contact patch is very pronounced, very rapid, and always has substantially the same profile. Thus, a value of 0.5 means that the number of measurement points that will be assigned to the negative energy density $S^-$ will not be decreased too greatly, or those assigned to $S^+$ will not be increased too greatly. Specifically, the objective is of the method is to employ a spatial discretization that is not very high. In general, very few measurement points are situated in the transition zone. As a result, the error on whether a value belongs to $S^-$ or to $S^+$ is minimal, if not to say zero, if no measurement point lies in the selection zone corresponding to C between 0.5 and 0.9. It will also be repeatable if use is made of a coefficient C that is fixed and proportional to $\gamma^{reference1}$ for all characterizations, and any error that may be induced will be repeatable and therefore transparent as compared with a reference level defined elsewhere.

Conversely, a C value equal to 1.0 is the theoretical value that allows the points to be discriminated between the two possible energy densities. While this is ideal on smooth ground with optimal conditions that minimize disturbing influences in the measurement sequence. The slightest disturbance may have an impact on the precision required for the result.

As a preference, having phased the second wheel revolution signal $\text{Sig}^{TdR2}$ with respect to an angular position of the tyre casing, a correction Corr is made to the second wheel revolution signal $\text{Sig}^{TdR2}$ to take account of the effect of the Earth's gravity.

The correction for the Earth's gravity means that the error on the deformation of the tyre casing can be minimized, particularly for low running speeds W. Specifically, the sensor, when the tyre casing is running, makes one revolution about the natural axis of rotation of the tyre casing. Because the output signal from the sensor is proportional to the radial acceleration, it will be tainted by the Earth's gravity. Over one revolution of the wheel, the Earth's gravity will generate a sinusoidal signal of amplitude g which is a function of the altitude of the sensor within the Earth frame of reference. This parasitic signal Corr therefore needs to be removed from the second wheel revolution signal $Sig^{TdR2}$, which means recalibrating the second wheel revolution signal with reference to an angular position of the tyre casing.

Of course, the higher the rotational speed W of the tyre casing, the more the centrifugal acceleration experienced by the sensor becomes predominant over this parasitic signal.

According to one particular embodiment, the identification of the deformation of the tyre casing $Def_\%$ comprises the following steps:

During the second phase:
Determining a second reference acceleration $\gamma^{reference2}$ associated with the second wheel revolution signal $Sig^{TdR2}$, the latter being defined as being the mean value of the second wheel revolution signal $Sig^{TdR2}$ with respect to one wheel revolution, using the following formula:

$$\gamma^{reference2} = \frac{\left(\sum_{Sig^{TdR2}} Sig^{TdR2}\right)}{N^{U2}};$$ [Math 9]

Identifying a value O as being the value $N^{U2}$ unless $N'^{U2}$ exists, in which case the value of O is $N'^{U2}$;

Identifying the deformation of the tyre casing $Def_\%$, which deformation is generated by the load, using one of the following formulae:

$$Def_\% = \frac{N^{U1}}{O} * \frac{[S^+ + (\gamma^{reference1} - \gamma^{reference2}) * N^{TdR2}]}{(N^{TdR2} * \gamma^{reference1})}, \text{ or}$$ [Math 10a]

$$Def_\% = \frac{N^{U1}}{O} * \frac{(S^-)}{(N^{TdR2} * \gamma^{reference1})}, \text{ or}$$ [Math 10b]

$$Def_\% = \frac{N^{U1}}{O} * \frac{[S^+ + S^- + (\gamma^{reference1} - \gamma^{reference2}) * N^{TdR2}]}{2 * (N^{TdR2} * \gamma^{reference1})}.$$ [Math 10c]

These formulations constructed on the positive energy density or on the negative energy density or on both allow the deformation of the tyre casing to be corrected to take account of the variation in the rotational speed W of the tyre casing between the two phases of the method.

In addition, the operations are elementary at the end of the second phase of the method where all the intermediate magnitudes have been identified. However, depending on the embodiment chosen for delimiting the second wheel revolution signal $Sig^{TdR2}$ from the first signal, it is necessary to specify, from among the values $N^{U2}$ and $N'^{U2}$, a value to be used for O.

The method takes into account both the change in the number of points between the first wheel revolution signal and the second wheel revolution signal as a result of a change in sampling frequency, and a change in the rotational speed W of the tyre casing.

In addition, the method also takes account of the error made in the second phase when the energy densities are evaluated with reference to the first reference acceleration $\gamma^{reference1}$ rather than the second reference acceleration $\gamma^{reference2}$.

Thus, this method allows the second reference acceleration $\gamma^{reference2}$ to be evaluated from the second wheel revolution signal $Sig^{TdR2}$ which has been constructed. This evaluation merely sums the increments of value of the first signal between the two boundaries of the second wheel revolution signal. When the second boundary is reached, all that is then required is for the sum to be divided by the total number of increments used to constitute the sum. This method is economical in terms of memory capacity and in terms of energy resources of the electronic device comprising the sensor of the method.

As a preference, the number of wheel revolutions $N^{TdR2}$ of the second wheel revolution signal $Sig^{TdR2}$ is unity.

The method is exact when one wheel revolution has been used to evaluate the various quantities. In order to save energy and memory resources, it is sensible to deploy the second phase of the method over just one revolution of the wheel. In addition, if the rotational speed W is variable, the shorter the second phase, the less significant will be the variability in the rotational speed W and the more precise will be the evaluation of the deformation of the tyre casing $Def_\%$.

Highly preferably, the number of wheel revolutions $N^{TdR1}$ of the first wheel revolution signal $Sig^{TdR1}$ is unity.

The method is exact when one wheel revolution has been used to evaluate the various quantities. Although the calculations performed during the first phase of the analysis are not as numerous, with a view to economizing on energy and memory resources in the electronic device, it is sensible to deploy the first phase of the method over just one single revolution of the wheel. In addition, if the rotational speed W is variable, the shorter will be the first phase of the method, the less significant will be the variability in the rotational speed W and the more precise will be the evaluation of the deformation of the tyre casing $Def_\%$.

Advantageously, having made $N_i$ evaluations, $N_i$ preferably being a whole number comprised between 3 and 10, and very preferably 5, of the deformation of the tyre casing $Def^i_\%$ over different first and second wheel revolution signals $Sig_i^{TdR1}$, $Sig_i^{TdR2}$ in the one same first signal, the deformation of the tyre casing $Def_\%$ is the mean of the deformations of the tyre casing $Def^i_\%$ according to the following formula:

$$Def_\% = \frac{\sum_i Def^i_\%}{N_i}$$ [Math 11]

In order to ensure the robustness of the evaluation of the deformation of the tyre casing when running at the rotational speed W when the first signal is emitted by the sensor, it is sensible to make several evaluations of the deformation of the tyre casing $Def^i_\%$. Each of these evaluations will have its own associated error because of factors external to the wheel-tyre assembly, such as, for example, defects in the roadway. So, calculating the mean of these various evaluations renders the identification of the true deformation of the tyre casing $Def_\%$ more robust.

According to one favoured embodiment, the Ni evaluations are performed successively so that the second phase of the evaluation Ni is the first phase of the evaluation Ni+1.

This being especially the case if these evaluations immediately succeed one another considering just one revolution of the wheel in each phase. So, the second phase of the previous iteration becomes the first phase of the current iteration. Thus, the deformation of the tyre casing is determined over a minimum number of revolutions of the wheel and the reference acceleration evaluated in the second phase of one iteration is used for the next iteration. In this way, there is a sharing of mathematical and logic operations. This is not very expensive in terms of memory capacity and energy resources for an evaluation that is robust.

BRIEF DESCRIPTION OF THE DRAWINGS

The invention will be better understood on reading the following description, which relates to the case of application to pneumatic tyres. This application is given solely by way of example and made with reference to the attached figures in which.

DETAILED DESCRIPTION OF EMBODIMENTS

Figure 1:
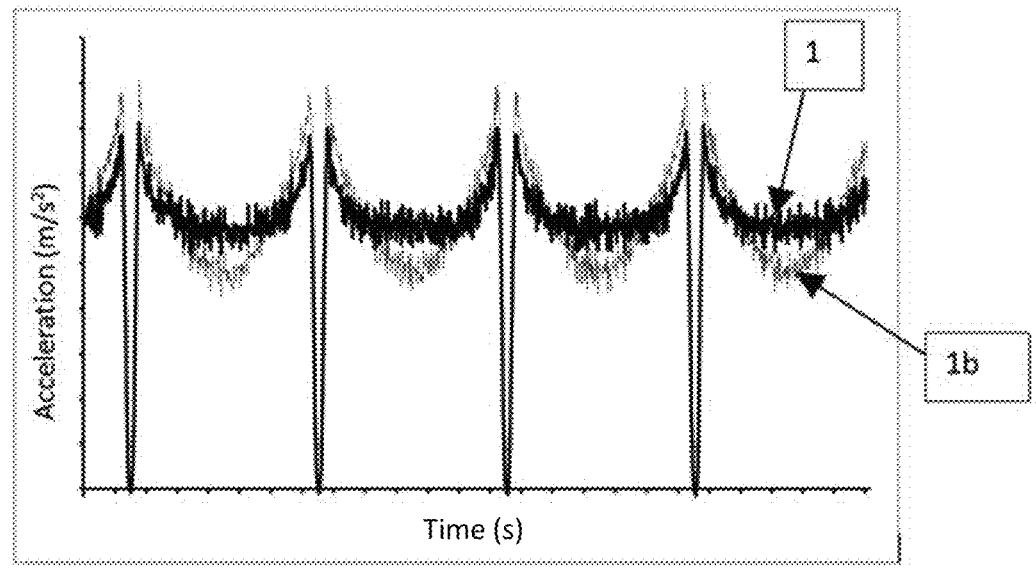
FIG. 1 is an example of a first signal of the method.

In order to implement the invention, a tyre casing has to be equipped with an electronic member comprising a sensor, a microcontroller, a clock, a memory space and an energy storage means, and radio frequency communications means capable of transmitting and possibly of receiving. The tyre casing comprises a crown, two sidewalls and two beads of revolution about a natural axis of rotation. The casing also comprises a median plane equidistant from the two beads, the intersection between the median plane and the natural axis of rotation defining a wheel centre.

The sensor is fixed to the tyre casing in line with the crown, in line with a rib or with a longitudinal groove which are regions of uniform stiffness, at a radial position R that is fixed with respect to the natural axis of rotation. The sensor is able to generate at least one output signal proportional to the acceleration normal to the crown that is experienced by the sensor inside the tyre casing. In fact, this sensor may be a single-axis sensor, in which case it needs to be positioned radially. It may also be made up of a plurality of single-axis sensors. In that case, the orientation of each of the single-axis sensors needs to be clearly identified with respect to the frame of reference of the tyre casing so as to reconstruct the acceleration normal to the crown of the tyre casing. Ideally, the sensor takes account of the continuous component and of the alternating component of the acceleration. In instances where only the alternating component is measured by the sensor, implementation of the method will require the continuous component to be constructed artificially. To do that, the rotational speed W of the tyre casing will need to be identified in real-time and the radial position R of the sensor will need to be precisely known. This is because the continuous component will be evaluated as being the centrifugal acceleration of the sensor with respect to the natural axis of rotation of the tyre casing. If the sensor takes account of the continuous component, this sensor may be an accelerometer using piezo-resistive or capacitive technology.

The electronic member is powered by the energy storage means, is controlled by the microcontroller with the aid of the clock, and also has implanted in it the calculation algorithms that make it possible for example to determine the state of deformation of the tyre by using the signals coming from the sensor element. The RF communications transmission means are used to transmit the calculated information and the reception means are used to receive operating instructions or information of use to the calculation algorithms. Ideally, this electronic member comprises or is associated with other measurement elements (measuring for example pressure, temperature, state of wear, distance travelled, etc.) so that components can be shared and operating costs optimized.

In this instance, the sensor is brought into operation by the microcontroller when the tyre casing is in a running condition. Of course, a threshold value for the rotational speed W beyond which acquisition of a sensor output signal is performed can be selected. The electronic member has a memory space suited to the type of analysis that is to be performed. In fact, the capacity of this memory space is predefined according to the use made of the electronic member. It is the microcontroller that controls the storage of the values from the sensor in the memory space. In addition, the microcontroller is able to perform elementary mathematical and logic operations on a reduced number of data. If the mathematical and logic operations are more complex, or if the number of data to be manipulated becomes great, the microcontroller is replaced by a microprocessor. Finally, the electronic member is powered by an energy storage means. The simplest energy storage means is the use of a battery. However, it is possible to envisage a large sized capacitor that can be recharged using a piezoelectric element.

The frequency range of the electronic member is able to cover a broad range of rotational speeds W with a spatial discretization of under 6 degrees. According to one particular embodiment, the sampling frequency is adaptive on demand or in response to a signal such as, for example, the rotational speed W of the tyre casing.

Optionally, the electronic member contains or is able to obtain the identification of the tyre casing. This information is useful for selecting a set of data that are useful for the calculation algorithms in the electronic member. If the electronic member needs to obtain the identification of the tyre or receive orders to take a measurement, the electronic member is equipped with a radiofrequency reception means. This operates in the low frequency range, ideally at the frequency of 125 kHz, so as to be free of the interference generated by the metallic regions of the tyre casing and its nearby environment in the vehicle.

According to one specific embodiment, the electronic member has radiofrequency transmission means, specifically in the UHF (ultra-high frequency) band, and particularly around 433 MHz or 900 MHz or what is known as the BLE (Bluetooth Low Emission) band which are free frequency bands. In addition, the UHF band makes it possible to have small antenna sizes making the electronic member easier to incorporate into the tyre casing.

This transmission communication is useful for transmitting the method data to the vehicle or to outside the vehicle. It is possible either to transmit the data string corresponding to the acquisition of the wheel revolution signal or to transmit the intermediate results that will have been calculated in the electronic member. This second transmission mode is necessarily less expensive in energy for the electronic member because the data stream is less intensive. Now, radiofrequency transmission consumes more energy than mathematical and logical operations.

FIG. 1 shows a first raw signal 1b in grey corresponding to the acceleration normal to the crown of a tyre casing of the heavy duty vehicle type running at a constant rotational speed W. Regularly, and periodically, the curve 1*b* passes through a near-zero value. This periodic phenomenon corresponds to the sensor passing through the contact patch of the tyre casing. The transition between the sensor passing through the contact patch of the tyre and the other part of the tyre casing occurs sharply at falling or rising fronts depending on whether the sensor is entering or leaving the contact patch. In addition, it will be noted that the first signal 1*b* on a scale of the order of one revolution of the wheel, follows a carrier wave, the first signal 1*b* oscillating about this carrier wave at a frequency higher than the frequency of revolution of the wheel. These oscillations correspond to the noise on the first signal 1*b* from the sensor, which noise is caused by the various unpredictable influences including the macroroughness of the road.

The curve indexed 1 in black represents the same accelerometer signal corrected only for the Earth's gravity, and which will be termed corrected first signal 1. The correction here is sinusoidal with the correction having being phased to a point situated at the centre of the contact patch, namely equal distances from the two wave fronts that delimit that part of the signal for which the value is near-zero. It may be seen that the first signal 1 is flatter between the regions characterizing the contact patch. It is preferable for the various steps of the method to be performed on this corrected first signal 1.

Figure 2:
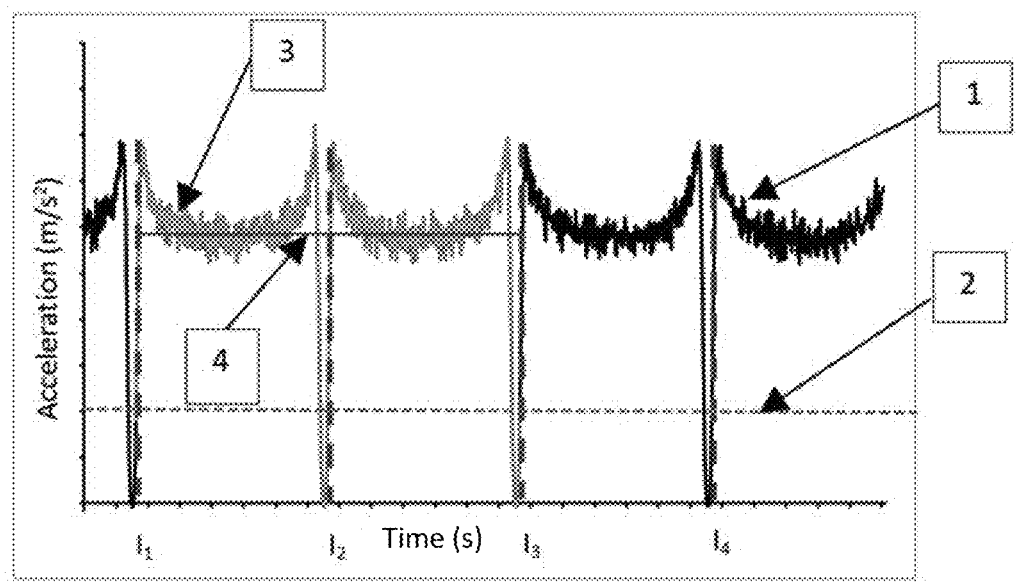
FIG. 2 shows the first wheel revolution signal $Sig^{TdR1}$ and how it is identified from the first signal.

FIG. 2 shows the method for detecting the first wheel revolution signal 3. From the first signal 1, in this instance corrected in order to explain the example better, there is determined a threshold value E, illustrated by the dotted line 2. A series of increments I is identified, these being where the first signal 1 crosses the dotted line 2, for example from beneath, which physically corresponds to the sensor, securely connected in terms of rotation to the tyre casing, exiting the contact patch. The first wheel revolution signal 3 is then delimited as being between a first increment, in this instance $I_1$, and a second increment, in this instance $I_3$. The wheel revolution signal here represents the accelerometer signal from the sensor over two full revolutions of the wheel.

The threshold value E represented by the dotted line 2 has in this case been evaluated over part of the first signal 1 with a variable sampling frequency. The maximum discretized value obtained is extracted from this part of the first signal 1 and named MAX. The threshold value E is therefore a value comprised between 10 and 50% of the value MAX, and in this instance, this value is around 20%.

The first reference acceleration $\gamma^{reference1}$ which is represented by the continuous line 4 in black, is calculated by way of the mean value of the first wheel revolution signal 3. It is evaluated in real-time by summing the values of the increments u of the first wheel revolution signal and then dividing, at the end of the wheel revolution signal, by the number of increments in the first wheel revolution signal.

Figure 3:
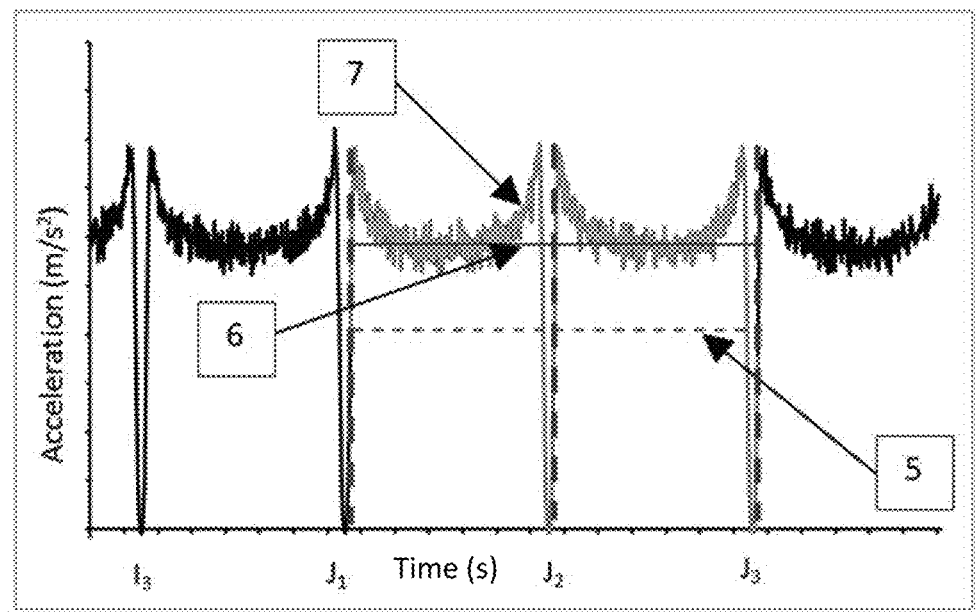
FIG. 3 shows the second wheel revolution signal $Sig^{TdR2}$ and how it is identified in a first embodiment.

FIG. 3 is an illustration of the delimitation of the second wheel revolution signal 7, in pale grey, from the first signal. This second wheel revolution signal 7 comes after the first wheel revolution signal which ends at the increment $I_3$. In this case, it is the first embodiment that is used for this delimitation.

From the first reference acceleration $\gamma^{reference1}$ illustrated by the continuous curve 4 in the preceding figure, a threshold value E' is determined, this value in this instance being situated at half the first reference acceleration $\gamma^{reference1}$. A series of increments J are then identified in the first signal corresponding to the crossing of the first signal through this threshold value E'. In the illustration it is the crossing of this threshold 1E' from below that has been used to identify the increments J. The increments corresponding to the crossing of the threshold E' from above could have been adopted. This threshold E' is illustrated by the dotted line 5. The second wheel revolution signal 7 in grey is therefore delimited using a first increment, in this instance $J_1$, and a second increment, in this instance $J_3$. This second wheel revolution signal 7 corresponds to a finite number of wheel revolutions, in this instance 2, give or take the discretization errors.

The second reference acceleration $\gamma^{reference2}$ illustrated by the continuous line 6 is calculated by way of the mean value of the second wheel revolution signal 7, in the same way as before for $\gamma^{reference1}$. This allows the calculation to be performed in real-time at the electronic member comprising the sensor by minimizing the memory and power resources of the electronic member.

Figure 4:
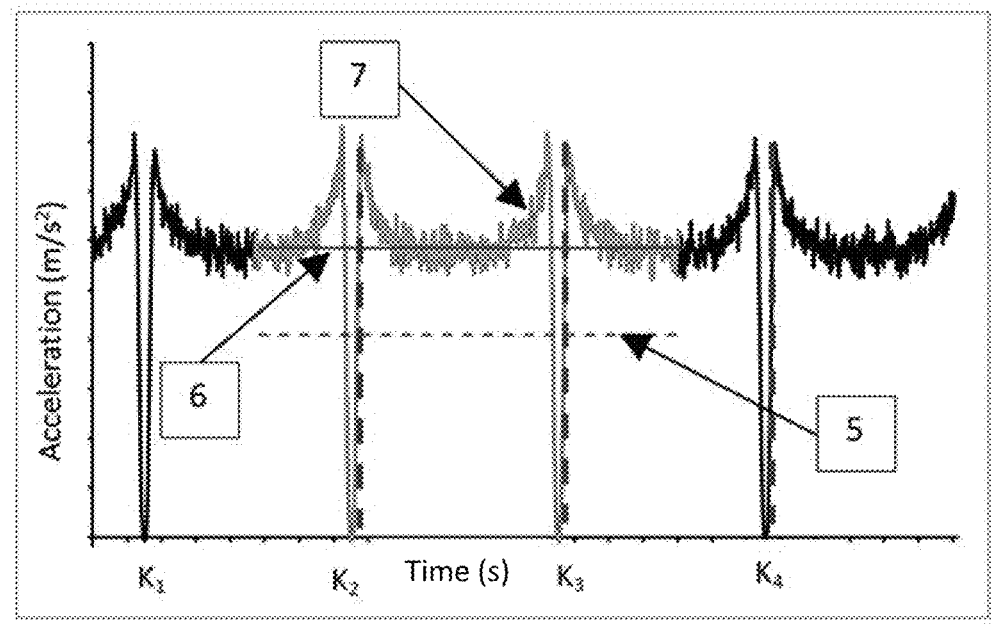
FIG. 4 shows the second wheel revolution signal $Sig^{TdR2}$ and how it is identified in another embodiment.

FIG. 4 is an illustration of the delimitation of the second wheel revolution signal 7, in grey, from the first signal. This second wheel revolution signal 7 comes after the first wheel revolution signal which ends at the increment $I_3$, which in this instance is the increment $K_1$. In this case, it is the second embodiment that is used for this delimitation.

From the first wheel revolution signal, it is possible to calculate the period T of the first signal, with respect to one revolution of the wheel. Next, the method identifies the first increment u of the first signal which is situated between one quarter and three quarters of the period T situated after the end of the first wheel revolution signal delimited by the increment K1. In the illustration of FIG. 4, the second wheel revolution signal has been arbitrarily chosen to begin shortly after halfway through the period. That corresponds physically to the moment at which the sensor is situated opposite the contact patch defined by the tyre casing as it rotates as one with the tyre casing.

A second wheel revolution signal 7, in grey, is therefore constructed over a duration t corresponding to an integer multiple of the period T. The first increment u of the first signal situated after the duration t of this second wheel revolution signal 7 will not be included in the second wheel revolution signal 7.

From this second wheel revolution signal 7, the method determines a second reference acceleration $\gamma^{reference2}$ as being the mean value of this second wheel revolution signal, represented by the continuous line 6.

Furthermore, the last increment u used for delimiting the first wheel revolution signal is used to define a series of increments K. The first increment $K_1$ corresponds to the last increment u used to delimit the end of the first wheel revolution signal. The other increments K are calculated using a threshold value E' represented by the dotted line 5 which will be less than or equal to half the first reference acceleration $\gamma^{reference1}$ defined on the first wheel revolution signal. These increments allow the number of increments $N^{rU2}$ to be identified.

Figure 5:
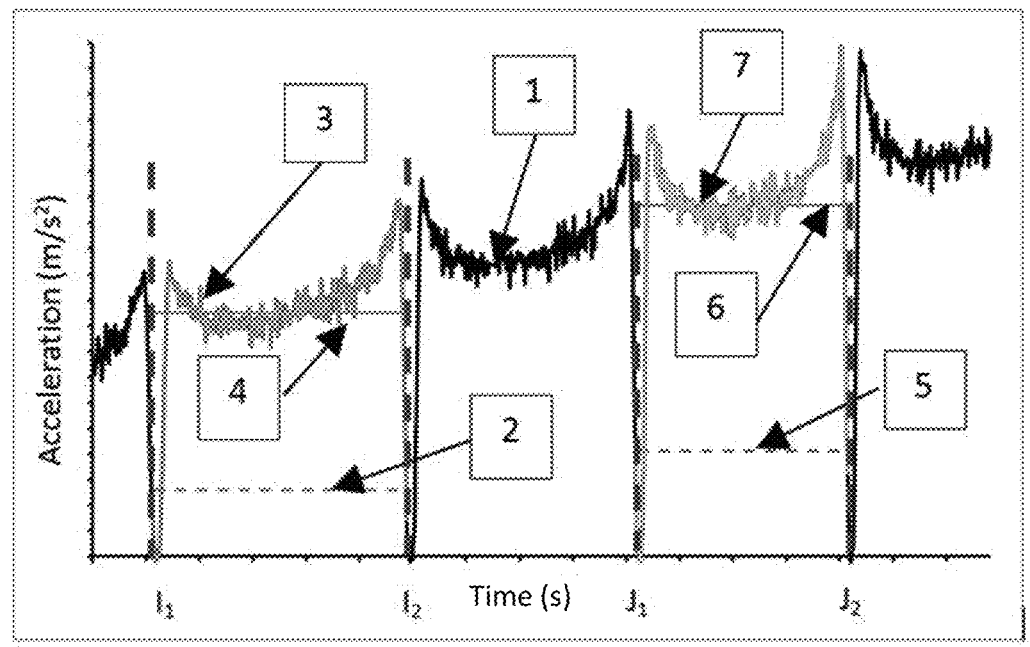
FIG. 5 shows the first and second wheel revolution signals $Sig^{TdR1}$ and $Sig^{TdR2}$ when running at a variable rotational speed W.

FIG. 5 shows a first signal 1, previously corrected for the Earth's gravity and corresponding to the acceleration normal to the crown of a tyre casing of the heavy duty vehicle type running at a variable rotational speed W.

Here, the thresholds E and E', represented respectively, for the first wheel revolution signal 3 in grey, and for the second wheel revolution signal 7 in pale grey, by the dotted lines 2 and 5, are determined.

The first threshold E makes it possible to identify the increments I corresponding, for example, to the sensor leaving the contact patch. In this analysis, the first wheel revolution signal is limited to one revolution of the wheel, as this is preferable in order to limit the errors associated with the variation in the rotational speed W of the tyre casing. The threshold E has been chosen so that it corresponds to half the reference acceleration of the first signal delimited over a whole number of wheel revolutions performed before the first wheel revolution signal 3. The first reference acceleration $\gamma^{reference1}$ is also calculated, on this first wheel revolution signal 3, as being the mean value of this first wheel revolution signal, represented by the continuous line 4.

The threshold E' for delimiting the second wheel revolution signal 7 here corresponds to half the first reference acceleration $\gamma^{reference1}$ of the first wheel revolution signal. The second wheel revolution signal is delimited from these wave fronts on a single revolution of the wheel. The second reference acceleration $\gamma^{reference2}$ is evaluated, on this second wheel revolution signal 7, as being the mean value of this second wheel revolution signal 7, represented by the continuous curve 6.

It will also be noted that, because the rotational speed W is variable here in the acceleration phase, the number of increments $N^{U1}$ and $N^{U2}$ between the first and the second wheel revolution signals 3 and 7 decrease substantially.

Figure 6:
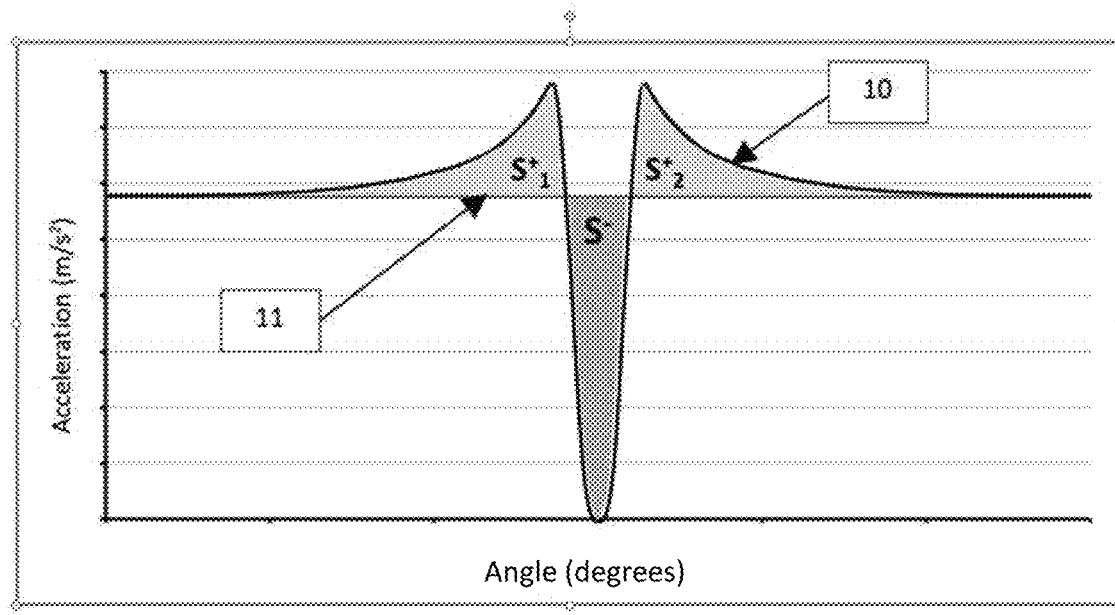
FIG. 6 shows the second wheel revolution signal $Sig^{TdR2}$ when running at a rotational speed W that remains constant over a revolution.

FIG. 6 is an illustration to explain the calculation of the energy densities that are positive $S^+$ and negative $S^-$ on a second wheel revolution signal 10 corresponding to a single revolution of the wheel when the rotational speed W is constant. Of course, the method is the same if the rotational speed W is variable or if the wheel revolution signal is delimited over several revolutions of the wheel.

The threshold A is determined here as being the product of a value C, in this instance equal to 1.0 times the first reference acceleration $\gamma^{reference1}$ identified on the first wheel revolution signal. This threshold is embodied by the continuous line 11. In fact, it is preferable on real signals, to adopt a value equal to 0.7 for C. If there is a lot of interference on the signals, then a C-value equal to 0.5 or 0.6 may be chosen. By contrast, for signals obtained on road surfaces that are smooth overall, a C-value of the order of 0.8 or 0.9 may be employed. This C-value needs to be fixed for all the steps of the method.

The positive energy densities $S^+$ or negative energy densities $S^-$ are calculated as the sum of the absolute values of the differences between the second wheel revolution signal 10 and the first reference acceleration $\gamma^{reference1}$ represented by the continuous curve 11. The area delimited by the areas $S^+$ has to be equal to the area delimited by the areas $S^-$, give or take the discretization errors.

The invention claimed is:

1. A method for obtaining the deformation of a tire casing subjected to a load, in an inflated and laden state rotating at a rotational speed W, the tire casing having a crown, two sidewalls and two beads of revolution about a natural axis of rotation and a median plane, an intersection between the median plane and the natural axis of rotation defining a wheel center, the method comprising the following steps:
   fixing at least one sensor on the tire casing in line with the crown, in line with a rib or with a longitudinal groove, at a radial position R with respect to the natural axis of rotation, the at least one sensor being configured to generate at least one output signal proportional to acceleration experienced by the at least one sensor in the tire casing, wherein the at least one sensor takes account of a continuous component and an alternating component of the acceleration, wherein if the at least one sensor takes account of only the alternative component, the continuous component is constructed artificially;
   subjecting the tire casing to the load, in the inflated and laden state rotating at the rotational speed W, which is identified in real-time, such that geometry or distribution of stress within a contact patch is directly connected to the load applied to the tire casing via inflation pressure of a wheel-tire assembly, wherein the contact patch is subject to macroroughness or unevenness of a road,
   acquiring a first abscissa signal u comprising at least an amplitude of the acceleration in a direction normal to the crown when running at the rotational speed W, at a sampling frequency fe the spatial discretization of which is less than 6 degrees;
   during a first phase:
      fixing a constant first sampling frequency fe1;
      delimiting the first signal over a whole number $N^{TdR1}$ of wheel revolutions, $N^{TdR1}$ being greater than or equal to 1, so as to construct a first wheel revolution signal $Sig^{TdR1}$;
      determining a first reference acceleration $\gamma^{reference1}$ as being a mean value of the wheel revolution signal $Sig^{TdR1}$ with respect to one wheel revolution, using the following formula $$\gamma^{reference1} = \frac{\left(\sum_{Sig^{TdR1}} Sig^{TdR1}\right)}{N^{U1}},$$

where $N^{u1}$ is the number of points in $Sig^{TdR1}$; and
   during a second phase:
      fixing a constant second sampling frequency fe2;
      delimiting the first signal over a whole number $N^{TdR2}$ of wheel revolutions, $N^{TdR2}$ being greater than or equal to 1, so as to construct a second wheel revolution signal $Sig^{TdR2}$;
      defining at least a first energy density S which is a function of the second wheel revolution signal $Sig^{TdR2}$, and of the reference acceleration $\gamma^{reference1}$, and which is denoted S+ when the wheel revolution signal is above a threshold value A, or is denoted S-when the wheel revolution signal is below or equal to the threshold value A, using the following formulae $$S^+ = \left|\sum\nolimits_{Sig^{TdR2}>A}\left(Sig^{TdR2} - \gamma^{Reference1}\right)\right| * \frac{N^{TdR2}}{N^{U2}},$$

and $$S^- = \left|\sum\nolimits_{Sig^{TdR2}\leq A}\left(Sig^{TdR2} - \gamma^{Reference1}\right)\right| * \frac{N^{TdR2}}{N^{U2}},$$

where $N^{U2}$ is the number of points in $Sig^{TdR2}$; and
identifying the deformation of the tire casing Def %, which deformation is generated by the load as a function of the reference acceleration $\gamma^{reference1}$ and of the first energy density S using one of the following formulae:

$$Def_\% = \frac{N^{U1}}{N^{U2}} * \frac{\left|\sum_{Sig^{TdR2}>Ao}\left(Sig^{TdR2} - \gamma^{Reference1}\right)\right|}{\left(\sum_{Sig^{TdR1}} Sig^{TdR1}\right)}, \text{ or}$$

-continued $$Def_\% = \frac{N^{U1}}{N^{U2}} * \frac{\left|\sum_{SignalTdR2 \leq A}\left(Sig^{TdR2} - \gamma^{Reference1}\right)\right|}{\left(\sum_{SigTdR1} Sig^{TdR1}\right)}, \text{ or}$$

$$Def_\% = \frac{N^{U1}}{N^{U2}} * \frac{\left|\sum_{SigTdR2 > A}\left(Sig^{TdR2} - \gamma^{Reference1}\right)\right| + \left|\sum_{SigTdR2 \leq A}\left(Sig^{TdR2} - \gamma^{Reference1}\right)\right|}{2*\left(\sum_{SigTdR1} Sig^{TdR1}\right)}.$$

2. The method according to claim 1, wherein the acquisition of the first signal is performed for a rotational speed W greater than or equal to a threshold rotational speed $W_{seuil}$ defined by the following formula:

$$W_{seuil} = \frac{12}{\sqrt{Dev}},$$

where Dev is the development of the tire casing.

3. The method according to claim 1, wherein the delimiting of the first signal over a number $N^{TdR1}$ of wheel revolutions comprises the following steps during the first phase:
   identifying a first series of increments I, corresponding to the abscissa value u of the first signal at which the first signal crosses above or below a threshold value E;
   delimiting the first signal between a first increment $I_{min}$ and a second increment $I_{max}$ so as to construct a first wheel revolution signal $Sig^{TdR1}$; and
   determining the number of wheel revolutions $N^{TdR1}$ as being the difference $I_{max}$ minus $I_{min}$.

4. The method according to claim 3, wherein the identification of the threshold E comprises the following steps before the first phase:
   fixing a sampling frequency fe0 for a first part of the first signal;
   identifying the maximum value MAX on the first part of the first signal; and
   defining the threshold value E which is a function of the value MAX.

5. The method according to claim 1, wherein the delimiting of the first signal over a number $N^{TdR2}$ of wheel revolutions comprises the following steps during the second phase:
   identifying a first series of increments J, corresponding to the abscissa value u of the first signal at which the first signal crosses above or below a threshold value E;
   delimiting the first signal between a first increment $J_{min}$ and a second increment $J_{max}$ so as to construct a second wheel revolution signal $Sig^{TdR2}$, and
   determining the number of wheel revolutions $N^{TdR2}$ as being the difference $J_{max}$ minus $J_{min}$.

6. The method according to claim 1, wherein the delimiting of the first signal over a number $N^{TdR2}$ of wheel revolutions comprises the following steps:
   during the first phase:
   identifying the period T1 using the following formula $$T_1 = \frac{N^{U1}}{fe1 * N^{TdR1}};$$

and
   during the second phase:
   constructing a second wheel revolution signal $Sig^{TdR2}$ beginning with the abscissa value u of the first signal situated at (1+M)/4 periods T1, M being a real positive number less than or equal to 2.0, after an end of the first wheel revolution signal $Sig^{TdR1}$,
   delimiting the second wheel revolution signal $Sig^{TdR2}$ over a duration $t_2$ corresponding to the period T1 multiplied by a natural whole number N2, the number of wheel revolutions $N^{TdR2}$ being equal to N2;
   identifying a first series of increments K, corresponding to the abscissa value u of the first signal beginning with the abscissa value u used to end the first wheel revolution signal $Sig^{TdR1}$, at which the first signal crosses above or below a threshold value E'; and
   determining $N'^{U2}$ as being the number of points in the first signal
      which are situated between the increments $K_1$ and $K_{N2+1}$, using the formula $$N'^{U2} = \frac{(U_{K_{N2+1}} - U_{K_1})}{N2} * N2,$$

or
      which are situated between the increments $K_1$ and $K_{N2+2}$, using the formula $$N'^{U2} = \frac{(U_{K_{N2+2}} - U_{K_1})}{N2 + 1} * N2.$$

7. The method according to claim 1, wherein the threshold value A for defining the first energy density is a function of the first reference acceleration $\gamma^{reference1}$.

8. The method according to claim 7, wherein the threshold value A for defining the first energy density is a function of a factor C, the factor C being greater than or equal to 0.5 and less than or equal to 0.9, using the following formula $$A = C * \gamma^{reference1}.$$

9. The method according to claim 1, further comprising, having phased the second wheel revolution signal $Sig^{TdR2}$ with respect to an angular position of the tire casing, making a correction Corr to the second wheel revolution signal $Sig^{TdR2}$ to take account of the effect of the Earth's gravity.

10. The method according to claim 1, wherein the identification of the deformation of the tire casing Def % comprises the following steps during the second phase:
   determining a second reference acceleration $\gamma^{reference2}$ associated with the second wheel revolution signal $Sig^{TdR2}$, the latter being defined as being a mean value of the second wheel revolution signal $Sig^{TdR2}$ with respect to one wheel revolution, using the following formula:

$$\gamma^{reference2} = \frac{\left(\sum_{SigTdR2} Sig^{TdR2}\right)}{N^{U2}};$$

identifying a value O as being the value $N^{U2}$ unless $N'^{U2}$ exists, in which case the value of O is $N'^{U2}$;
   identifying the deformation of the tire casing $Def^i\%$, which deformation is generated by the load, using one of the following formulae $$Def_\% = \frac{N^{U1}}{O} * \frac{\left[S^+ + \left(\gamma^{reference1} - \gamma^{reference2}\right) * N^{TdR2}\right]}{\left(N^{TdR2} * \gamma^{reference1}\right)}, \text{ or}$$

$$Def_\% = \frac{N^{U1}}{O} * \frac{(S^-)}{\left(N^{TdR2} * \gamma^{reference1}\right)}, \text{ or}$$

$$Def_\% = \frac{N^{U1}}{O} * \frac{\left[S^+ + S^- + \left(\gamma^{reference1} - \gamma^{reference2}\right) * N^{TdR2}\right]}{2 * \left(N^{TdR2} * \gamma^{reference1}\right)}.$$

11. The method according to claim 1, wherein the number of wheel revolutions $N^{TdR2}$ of the second wheel revolution signal $Sig^{TdR2}$ is unity, and the number of wheel revolutions $N^{TdR1}$ of the first wheel revolution signal $Sig^{TdR1}$ is unity.

12. The method according to claim 1 wherein, having made $N_i$ evaluations of the deformation of the tire casing $Def^i\%$ over different first and second wheel revolution signals $Sig^{TdR1}$, $Sig^{TdR2}$ in the one same first signal, the deformation of the tire casing $Def\%$ is the mean of the deformations of the tire casing $Def^i\%$ according to the following formula $$Def_\% = \frac{\sum_i Def^i_\%}{N_i}.$$

13. The method according to claim 12, wherein the $N_i$ evaluations are performed successively so that the second phase of the evaluation $N_i$ is the first phase of the evaluation $N_{i+1}$.

\* \* \* \* \*